No. 768,895. PATENTED AUG. 30, 1904.
M. DELGOFF.
HANGER FOR GRINDSTONES.
APPLICATION FILED DEC. 18, 1903.
NO MODEL.
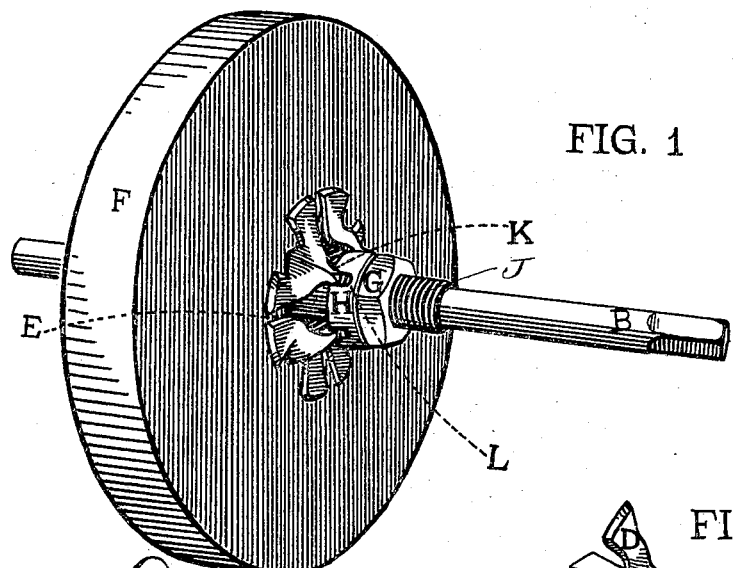
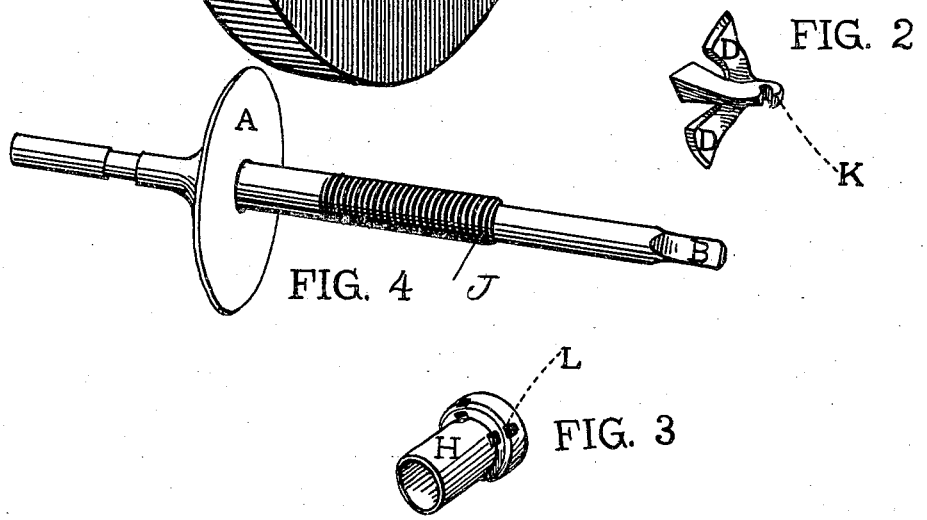
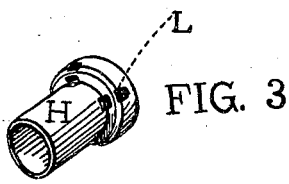
WITNESSES: INVENTOR.

No. 768,895. Patented August 30, 1904.

UNITED STATES PATENT OFFICE.

MARY DELGOFF, OF MENOMINEE, MICHIGAN.

HANGER FOR GRINDSTONES.

SPECIFICATION forming part of Letters Patent No. 768,895, dated August 30, 1904.

Application filed December 18, 1903. Serial No. 185,761. (No model.)

*To all whom it may concern:*

Be it known that I, MARY DELGOFF, a citizen of the United States, residing at the city of Menominee, in the county of Menominee and State of Michigan, have invented a new and Improved Hanger for Grindstones, of which the following is a specification.

My invention relates to improvements in hangers for grindstones in which four adjustable clasps operate in conjunction with a collar and nut and a spindle with detachable flange the utile surface of which is at right angles to the spindle; and the object of my invention is to provide a means by which a grindstone may be quickly hung upon its arbor and at the same time hung upon its true center and in a perfect right angle to its arbor. I attain these objects by the mechanism illustrated in the accompanying drawings, in which—

Figure 1 is a perspective section of the entire machine; Fig. 2, a detailed view in perspective of the clasps, of which there are four; Fig. 3, a detailed view in perspective of the collar; Fig. 4, a view in perspective of the spindle.

Similar letters refer to similar parts throughout the several views.

The grindstone F is of the ordinary character and is provided with the usual rectangular eye E, and the hanging device for the stone consists of four clasps, which are preferably made of metal, A A A A, and are provided on one end with rectangular shoulders D D D D and on the other end with a hook; a collar H, which is provided on its outer surface with four openings at equal distances from each other; a nut G, and a spindle B, having a flange A, the utile surface of which is at right angles to the spindle B, and a thread H, cut at a place where when tightening the device the nut G will operate upon it. All the parts of the hanging device are preferably made of metal.

In applying this invention the stone F is placed squarely against the flange A, attached to the spindle B, the rectangular shoulders D D D D of the four clasps A A A A are placed one in each corner of the rectangular eye E of the stone F, the hook at other end of each of the clasps A A A A is placed in one of the openings in the collar J, and the entire device tightened by the nut G. This process forces the stone F into a position in which every point of its circumference, if a true wheel, is equidistant from the center of the spindle B and in which it is at a perfect right angle to the spindle B and held rigidly into place and is accomplished more easily and quickly than any other known process of hanging grindstones.

Having thus described my invention, I claim as new and desire to secure by Letters Patent—

In a hanger for grindstones a shaft provided with a flange and screw-threads, in combination with a collar provided with openings, four detachable clasps each provided with a hook on one end and a shoulder at the other; said hooks engaging the openings in the collar and a nut, substantially as set forth.

In testimony whereof I have signed my name to this specification in the presence of two subscribing witnesses.

MARY DELGOFF.

Witnesses:
 EDMOND VALCQ,
 WM. SOMERVILLE.